United States Patent [19]
Hanson et al.

[11] Patent Number: 5,172,561
[45] Date of Patent: Dec. 22, 1992

[54] PRE-TRIP DIAGNOSTIC METHODS FOR A TRANSPORT REFRIGERATION UNIT

[75] Inventors: Jay I. Hanson, Bloomington; James E. Nixon, Woodbury, both of Minn.

[73] Assignee: Thermo King Corporation, Minneapolis, Minn.

[21] Appl. No.: 877,306

[22] Filed: May 1, 1992

[51] Int. Cl.$^5$ .............................. F25B 49/00
[52] U.S. Cl. ....................... 62/127; 62/130; 62/131; 364/186; 364/579
[58] Field of Search .............. 62/125, 126, 127, 129, 62/130, 131, 160, 228.4, 239, 323.1; 165/11.1; 236/94; 364/557, 507, 579, 580, 186

[56] References Cited

U.S. PATENT DOCUMENTS

| | | | |
|---|---|---|---|
| 4,211,089 | 7/1980 | Mueller et al. | 62/126 X |
| 4,448,033 | 5/1984 | Briccetti | 364/579 X |
| 4,663,725 | 5/1987 | Truckenbrod et al. | 364/505 |
| 4,688,389 | 8/1987 | Iida | 62/127 |
| 4,852,361 | 8/1989 | Oike | 62/131 |
| 4,918,932 | 4/1990 | Gustafson et al. | 62/89 |

Primary Examiner—Harry B. Tanner
Attorney, Agent, or Firm—D. R. Lackey

[57] ABSTRACT

Pre-trip operational methods and procedures for automatically checking predetermined functions and the operating performance of a transport refrigeration unit which includes a refrigerant compressor, and a prime mover for the refrigerant compressor which includes an internal combustion engine. The methods include the steps of measuring the current draw of predetermined electrical components with the prime mover stationary, starting the engine when the current draw is normal, determining if the speed of the engine is in an allowable range, commanding the unit to operate in a cooling mode, checking for adequate cooling capacity as a dynamic function of the temperatures of the return air, discharge air, and ambient air, commanding the unit to operate in a heating mode, determining if the unit is actually operating in the heating mode, and preparing an indication of a fault condition descriptive of any detected malfunction and/or marginal operating performance.

13 Claims, 9 Drawing Sheets

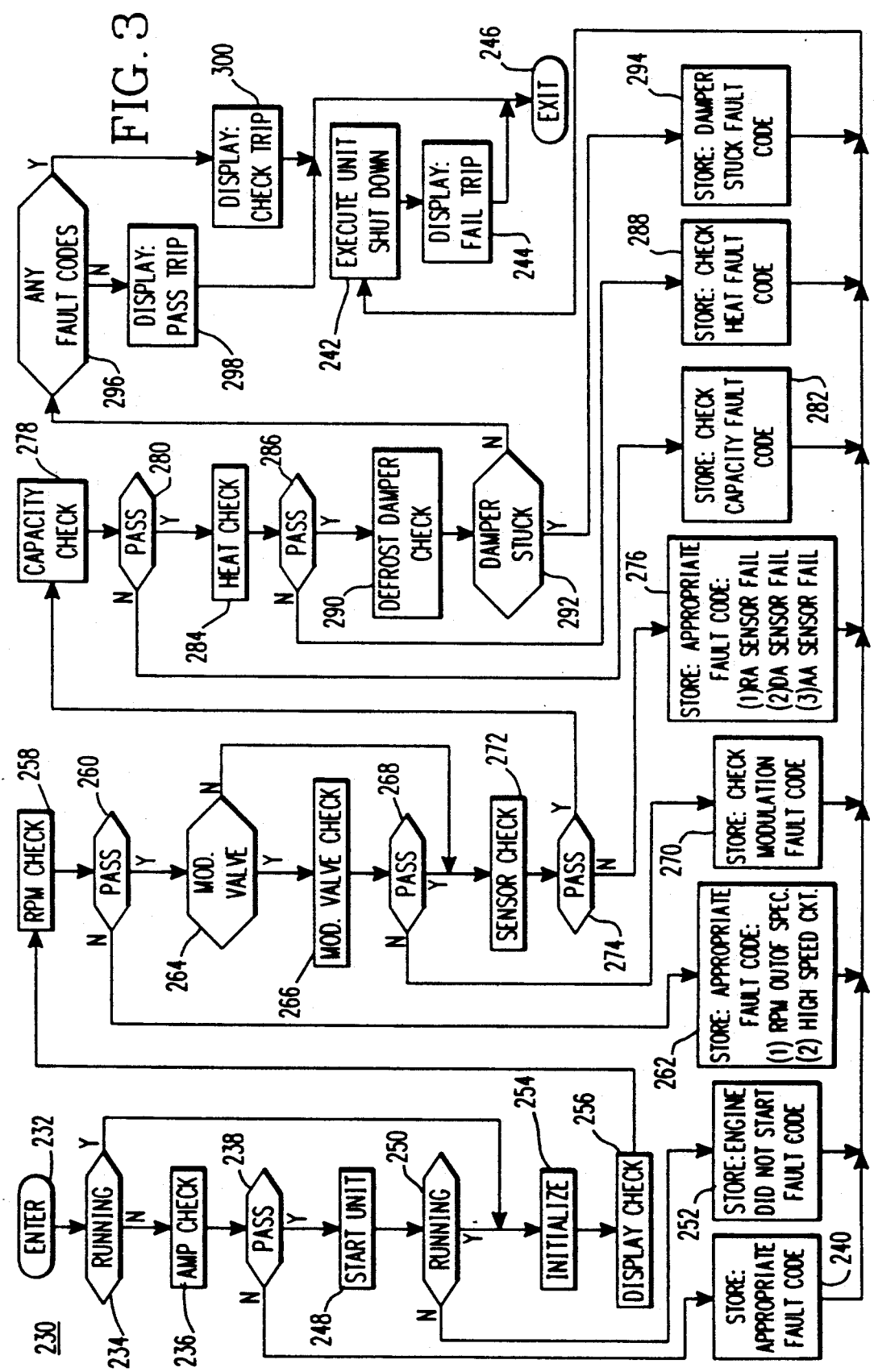

5,172,561

PRE-TRIP DIAGNOSTIC METHODS FOR A TRANSPORT REFRIGERATION UNIT

TECHNICAL FIELD

The invention relates in general to transport refrigeration systems, and more specifically to methods of checking a transport refrigeration unit for proper operation prior to each trip.

BACKGROUND ART

U.S. Pat. No. 4,663,725, which is assigned to the same assignee as the present application, discloses the use of microprocessor based transport refrigeration control for use with a refrigerated container, with the refrigerant compressor being driven by an electric motor. The use of a microprocessor is used to operate the various components of a refrigeration unit according to predetermined algorithms, and to detect and record faults which occur during the operation thereof.

U.S. Pat. No. 4,918,932, which is assigned to the same assignee as the present application, discloses the use of a microprocessor in the control of a transport refrigeration unit to determine average error between an operator selected set point temperature and the temperature of a space to be conditioned, using the outputs of return air and discharge air sensors, and the use of the average error in the determination of an error signal which modulates the capacity of the transport refrigeration unit.

While these patents ably utilize the capabilities of a microprocessor during the operation of a transport refrigeration unit, it would be desirable, and it is an object of the present invention, to further utilize the capabilities of the microprocessor which operates the unit, for directing a completely automatic, comprehensive pre-trip diagnostic procedure which detects malfunctions and marginal operation of the unit before it leaves a terminal with a new load. Such a pre-trip diagnostic procedure would also be available as an aid in the testing of the unit at the time of manufacture.

SUMMARY OF THE INVENTION

Briefly, the present invention is a method of automatically checking predetermined functions and operating performance of a transport refrigeration unit having electrical control, electrically controlled components, a refrigeration circuit which includes a refrigerant compressor, and a prime mover for the refrigerant compressor which includes an internal combustion engine. The transport refrigeration unit conditions air returned from a cargo space via commanded heating and cooling modes, as required to hold a predetermined set point temperature, and the unit discharges conditioned air back into the cargo space. Temperature sensors are provided for sensing the temperatures of the return air, discharge air and ambient air.

The method, in a preferred embodiment, comprises the steps of measuring the current draw of predetermined electrical components with the prime mover stationary, and comparing the measured current draw of each electrical component with an allowable range for the component.

The method further includes the steps of starting the internal combustion engine at a predetermined rated speed when the comparison step finds that the current draw for each component checked is in the associated allowable range, determining the actual speed of the internal combustion engine, and comparing the actual speed of the internal combustion engine with an allowable range for the predetermined rated speed. The transport refrigeration system is commanded to operate in a cooling mode, and the method includes checking the unit for adequate cooling capacity as a dynamic function of the temperature values of the return air, discharge air, and ambient air.

The method continues via the step of commanding the transport refrigeration system to operate in a heating mode, and then determining if the transport refrigeration system is operating in the commanded heating mode by comparing the temperatures of the return air and discharge air. The method also includes the step of preparing an indication of a fault condition descriptive of any detected malfunction.

In a preferred embodiment of the invention, applicable when the transport refrigeration unit includes a suction line modulation valve, operation of the modulation valve is determined by sensing the speed of the prime mover before and after closing of the modulation valve. The diagnostic procedure checks the prime mover for proper operational speed prior to such testing of the modulation valve.

The pre-trip diagnostic procedure is automatic once initiated by an operator, insuring that all active components and refrigerant cooling and heating functions are checked prior to every trip made by the transport refrigeration unit. Further, the pre-trip diagnostic procedure of the invention is useful during manufacture of the unit for detecting faulty and incorrect wiring, faulty components, and marginal operating performance.

BRIEF DESCRIPTION OF THE DRAWINGS

The invention will become more apparent by reading the following detailed description in conjunction with the drawings, which are shown by way of example only, wherein:

FIG. 3 is a flow diagram of a program which sets forth microprocessor controlled pre-trip diagnostic procedures which utilize the methods of the invention;

DESCRIPTION OF PREFERRED EMBODIMENTS

Figure 1:
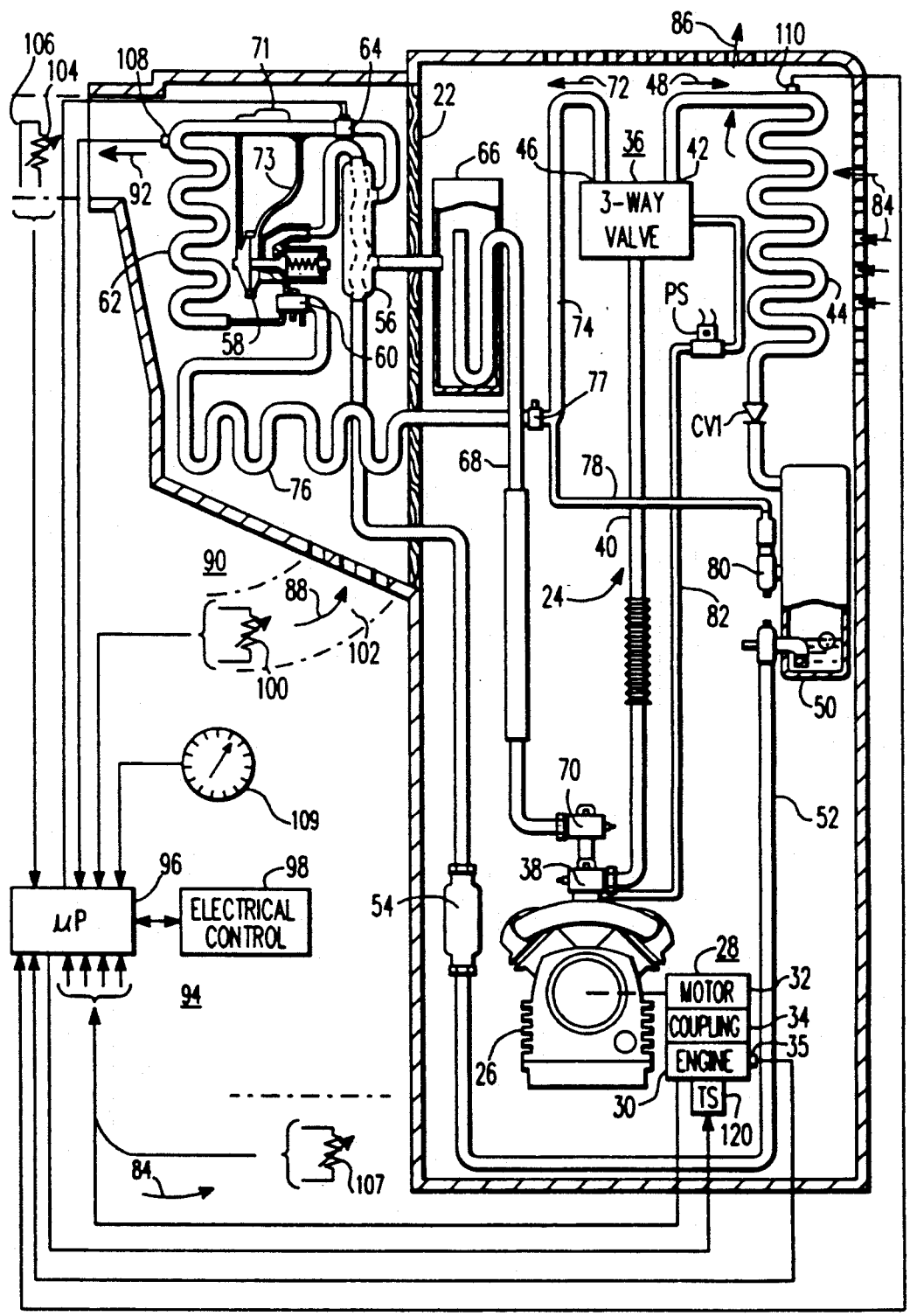
FIG. 1 is a partially block and partially schematic diagram of a transport refrigeration unit which may utilize the methods of the invention.

Referring now to the drawing, and to FIG. 1 in particular, there is shown a transport refrigeration unit 20 which may utilize the methods of the invention. Refrigeration unit 20 may be mounted on a container, truck, or trailer, such as on a wall 22 thereof, for example. Refrigeration unit 20 has a closed fluid refrigerant circuit 24 which includes a refrigerant compressor 26 driven by a prime mover arrangement 28. Prime mover arrangement 28 includes an internal combustion engine 30, and it may optionally include a stand-by electric motor 32. Engine 30 and motor 32 are coupled to compressor 26 by a suitable clutch or coupling 34 which disengages engine 30 while motor 32 is operative. A selector 35 selects one of the two prime movers and provides an output signal to identify the selection.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle, with the first output port 42 being connected to the inlet side of a condenser coil 44. Three-way valve 36 has a second output port 46, which is selected to initiate a heating cycle, as will be hereinafter described.

When three-way valve 36 selects the cooling cycle output port 42, it connects compressor 26 in a first refrigerant circuit 48, which in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired. Expansion valve 58 is controlled by a thermal bulb 71 and a pressure equalizer line 73.

When three-way valve 36 selects the heating cycle output port 46, it connects compressor 26 in a second refrigerant circuit 72. The second refrigerant circuit 72 by-passes condenser 44 and expansion valve 58, connecting the hot gas output of compressor 26 to the refrigerant distributor 60 via a hot gas line 74 and a defrost pan heater 76. A hot gas by-pass solenoid valve 77 may optionally be disposed in hot gas line 74. A by-pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low pressure side of compressor 26 via a normally closed pilot solenoid valve PS. When solenoid valve PS is de-energized and thus closed, three-way valve 18 is spring biased to select the cooling cycle output port 42. When evaporator 62 requires defrosting, and when the load being conditioned requires heat to maintain set point, pilot solenoid valve PS is energized to allow the low pressure side of compressor 26 to operate three-way valve 36 to select the heating cycle output port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a served cargo space 90 whose air is to be conditioned, through the evaporator coil 62, and the resulting cooled or heated conditioned air 92, called "discharge air", is returned to the space cargo 90. During an evaporator defrost cycle, a defrost air damper 93 may be operated to close the discharge air path to the conditioned space 90.

Transport refrigeration unit 20 is controlled by microprocessor based electrical control 94 which includes a microprocessor 96 and electrical control 98. Electrical control 98 includes relays, and the like, as will be explained relative to FIGS. 2A and 2B. The microprocessor 96 receives input signals from appropriate sensors, such as from a return air temperature sensor 100 disposed in a suitable return air path 102, a discharge air temperature sensor 104 disposed in a suitable discharge air path 106, from an ambient air temperature sensor 107 disposed to sense the temperature of ambient air 84, from a coil temperature sensor 108 disposed to sense the temperature of the evaporator coil 62, and from a set point temperature selector 109. Additional input signals may be provided by a refrigerant pressure sensor (HPCO) 110 disposed on the high side of the refrigerant circuit 48, and by various engine sensors shown in FIG. 2B, which are associated with engine 30, such as an oil level sensor 112, an oil pressure sensor 114, an engine coolant temperature sensor 116, and an engine speed (RPM) sensor 118.

Microprocessor 96, among other things, controls modulation valve 64, hot gas solenoid valve 77, and a throttle or high speed solenoid 120. Other functions controlled by microprocessor 96 are shown in FIGS. 2A and 2B, and will be hereinafter described.

Figure 2A:
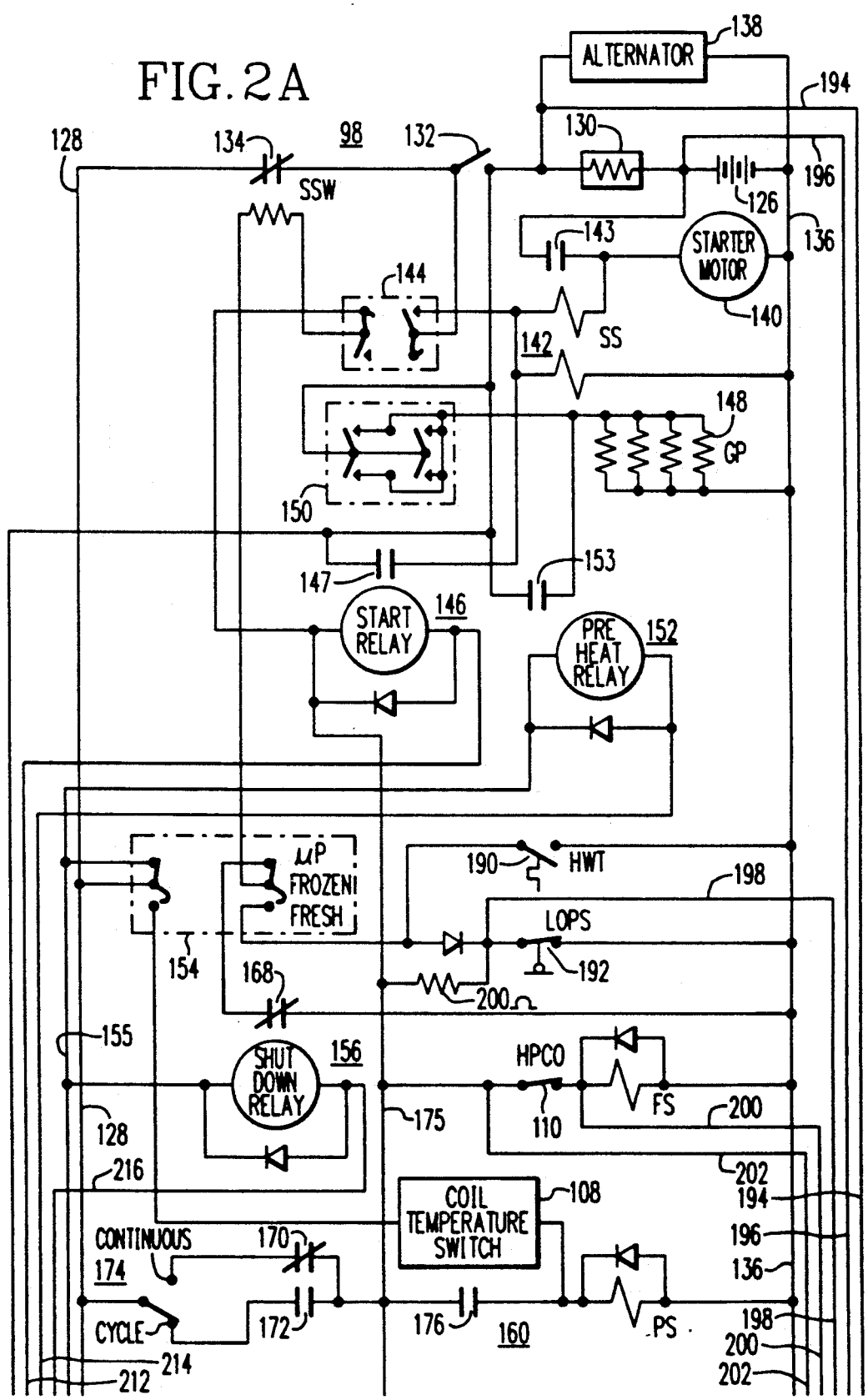
FIGS. 2A and 2B may be assembled to provide an electrical schematic diagram of microprocessor based electrical control shown in block form in FIG. 1.
Figure 2B:
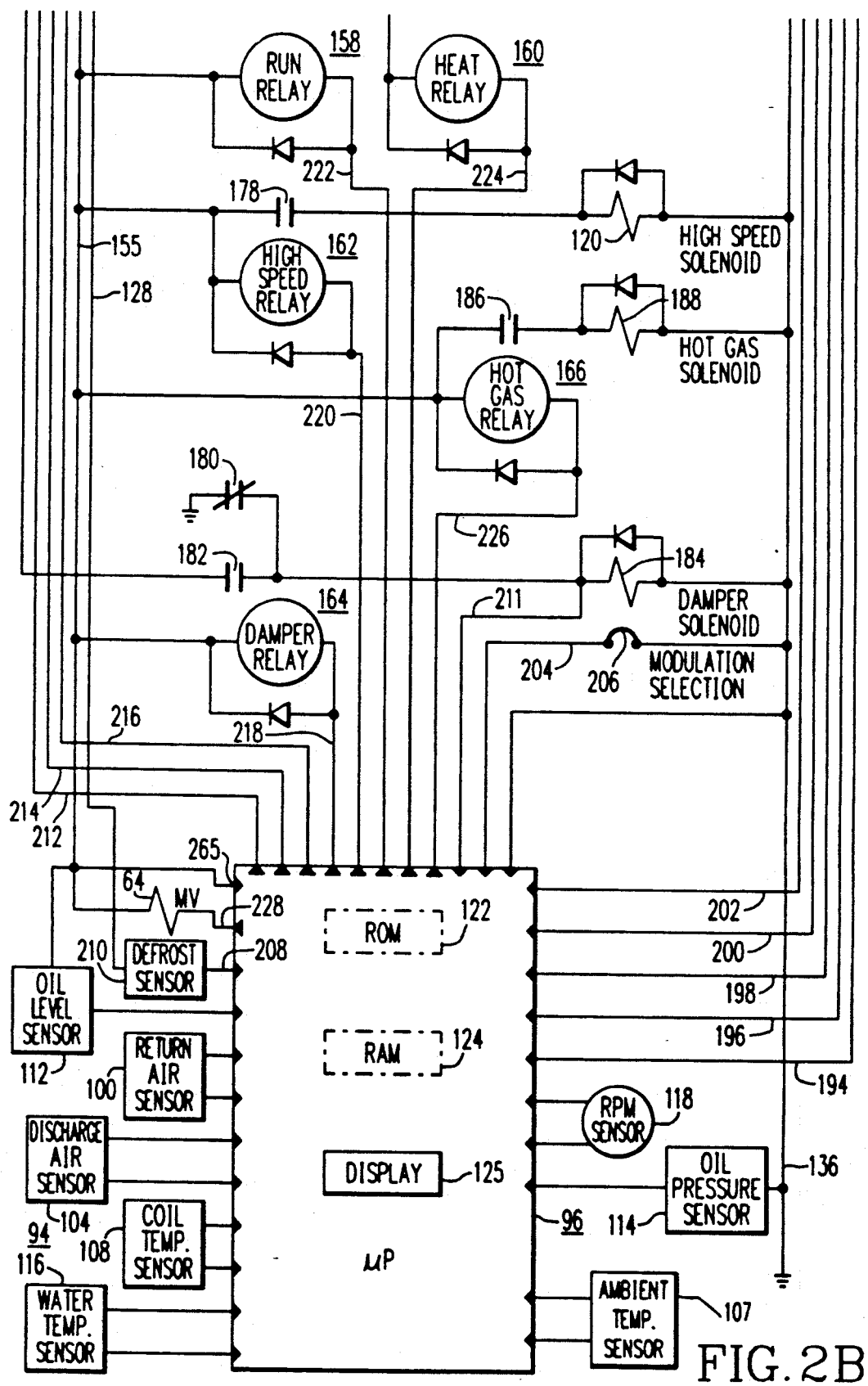

FIGS. 2A and 2B may be assembled to provide a detailed schematic diagram of microprocessor based electrical control 94, which includes microprocessor 96 and control 98. As is well known, microprocessor 96 includes a read-only memory (ROM) 122 for storing application specific programs to be hereinafter described. Microprocessor 96 also includes a random access memory (RAM) 124 for storing software timers, flags, input signals, output signals, and for storing other program variables generated by the operating programs. Microprocessor 96 also includes a display 125, which, for example, may include various types of optoelectronic display devices, such a segmented numeric display 127, or an alphanumeric display, indicator lamps 129, and the like, for displaying fault codes and system status signals. Only a few display elements are indicated on display 125, but it is to be understood that display 125 will contain all of the elements necessary to display fault codes, as well as predetermined messages for use by the operator and maintenance personnel. Application Ser. No. 07/728,468, filed Jul. 11, 1991, which is assigned to the same assignee as the present application, includes an example of a suitable display configuration which may be used.

Electrical control 98 includes a battery 126 which has one side connected to a first conductor 128 via a DC shunt 130, an on-off switch 132, and normally closed contacts 134 of a protective reset switch SSW. The remaining side of battery 126 is connected to conductor 136, which is grounded. Control 98 further includes an alternator 138 driven by prime mover 28; a starter motor 140, for cranking engine 30, which is controlled by a starter solenoid 142 having associated normally open contacts 143, an ignition switch 144, and a start relay 146 having associated normally open contacts 147; and glow plug resistors (GP) 148, for pre-heating engine 30, which are controlled by a pre-heat switch 150 and by a pre-heat relay 152 which has normally open contacts 153.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places unit 20 under control of the microprocessor 96. The upper position provides voltage from conductor 128 to a conductor 155. An intermediate position of switch 154, in which the center terminal is not connected to either the upper terminal or the lower terminal, is selected when the microprocessor 96 is not utilized and the load in the conditioned space 90 is frozen. This switch position will cause unit 20 to operate continuously in a low speed cool mode. The lower position of switch 154 is selected when the microprocessor 96 is not utilized and the load in the conditioned space is fresh. This position of switch 154 will cause unit 10 to operate continuously, cycling between heating and cooling cycles under the control of the hereinbefore mentioned coil temperature switch 108. Coil temperature switch 108 is preset to close at a predetermined coil temperature, such as 35 degrees F., to energize the pilot solenoid PS and initiate a heating cycle, and to open at a predetermined higher temperature, such as 38 degrees F., to de-energize pilot solenoid PS and initiate a cooling cycle.

In addition to the relays already mentioned, control 98 includes a shutdown relay 156, a run relay 158, a heat relay 160, a high speed relay 162, a defrost damper relay 164, and a hot gas relay 166. Shutdown relay 156 is normally energized, and is de-energized to shut unit 10 down via its associated set of normally-closed contacts 168 which ground the protective switch SSW and cause it to open its contacts 134. The run relay 158 has normally-closed and normally open contacts 170 and 172, respectively, connected to a mode selector switch 174 which has an input connected to conductor 128. Selector switch 174 selects either a continuous operating mode in which the prime mover 28 operates continuously, or a cycling start-stop mode, which includes starting and stopping the prime mover 28.

The normally-closed contacts 170 of run relay 158 are connected to the "continuous" position of selector switch 174, and the normally-open contacts 172 of run relay 158 are connected to the "cycling" position of selector switch 174. Contacts 170 or contacts 172 provide voltage to a conductor 175 from conductor 128 and selector switch 174.

Heat relay 160 has a set of normally open contacts 176 for controlling the pilot solenoid PS. High speed relay 162 has a set of normally open contacts 178 for controlling the high speed solenoid 120. Damper relay has a set of normally closed contacts 180 and a set of normally open contacts 182, connected to control a defrost damper solenoid 184 which operates damper 93 shown in FIG. 1. Hot gas relay 166 is provided for controlling the hot gas solenoid valve 77 via a set of normally open contacts 186, when a hot gas solenoid 77 is provided in hot gas line 74.

Control 98 also includes an engine coolant temperature switch (high water temperature -HWT) 190, which closes when the engine coolant reaches a predetermined elevated temperature, and a low oil pressure switch (LOPS) 192 which is open as long as engine pressure is normal. The closing of either switch 190 or 192 will shut transport refrigeration unit 20 down by opening contacts 134 of the manual reset switch SSW.

Microprocessor 96 senses the voltage across DC shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, ie., negative, indicates the battery is discharging.

Microprocessor 96 also has a conductor 198 which senses the position of the low oil pressure switch 192, conductors 200 and 202 which sense the voltage level on first and second sides, respectively, of the high refrigerant cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, and a conductor 211 which provides a feed back signal which informs microprocessor 96 whether or not an operating voltage is applied to the damper solenoid 184, thus indicating the position of defrost damper 93.

Microprocessor 96 has a plurality of output conductors for controlling various functions, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the magnitude of current flowing through the modulation valve 64.

As the microprocessor functions are described, only those necessary to understanding the invention will be described in detail. Certain of the functions shown in block form, may be described in detail and claimed in application Ser. Nos. 07/728,463; 07/728,464; 07/728,465; 07/728,467; 07/728,468; 07/728,471; 07/728,472; and 07/728,665 filed Jul. 11. 1991, and in application Ser. No. 07/833,230, filed Feb. 10, 1992.

FIG. 3 is a flow diagram of a pre-trip diagnostic program 230 which, along with the detailed programs of FIGS. 4–8 which are associated with FIG. 3, set forth the teachings of the invention. The pre-trip procedure for checking unit 20 is initiated by an operator, such as by closing the on-off switch 132 shown in FIG. 2A, and by entering a predetermined code via display 125 shown in FIG. 2B. Prior to entering the code the operator should check display 125 for uncleared faults or alarms, as program 230 will not initiate when there are any uncleared faults or alarms.

Program 230 is entered at 232 and step 234 determines if unit 20 is running. The pre-trip procedure of the invention is made up of two distinct parts, a pre-trip unit-not-running routine, and a pre-trip unit-running routine. Pre-trip is preferably initiated when unit 20 is not running, ie., the prime mover 28 not operative, in order to perform the unit-not-running routine. When step 234 finds unit not running, steps 236 and 238 perform an ampere or current checking procedure which systematically checks each active component of unit for DC current draw, utilizing battery 126 as the voltage source. Step 236 includes a comparison of the ampere measurements with an acceptable current draw range for each component being tested. This test checks unit wiring as well as all active components. The ampere draw check of step 236 is set forth in detail in the hereinbefore mentioned application Ser. No. 07/728,471, filed Jul. 11, 1991, which is hereby incorporated into the specification of the present application by reference.

If step 238 finds that any component of unit 20 failed to pass the ampere draw check of step 236, program 230 branches to step 240. Step 240 stores an appropriate fault code identifying the faulty component or function. Step 240 proceeds to step 242 which aborts pre-trip and executes a shut-down sequence for unit 20. Step 244 displays "FAIL TRIP" on display 125, and pre-trip program 230 exits at 246.

When the ampere checking steps 236 and 238 find all components have a current draw within their respective allowable ranges, steps 248 and 250 start unit 20 by activating prime mover 28, such as by starting internal combustion engine 30. After a reasonable time sufficient for a normal engine start, step 250 determines if engine 30 is running. If engine 30 is not running, step 250 branches to step 252 which stores a fault code which indicates engine 30 failed to start, and step 252 proceeds to the hereinbefore described unit shutdown steps 242 and 244.

When step 250 finds engine 30 running, program 230 continues by initializing unit 20 to predetermined operating conditions. When step 234 finds unit 20 running, it also goes to the initializing step 254. The initializing step 254 commands unit 20 to operate in a cooling mode, and commands engine 30 to operate at the lower of predetermined selectable operating speeds. For example, engine 30 may be operable at either low speed or high speed, which may be 1400 RPM and 2200 RPM, respectively. If unit 20 includes suction line modulation valve 64, step 254 also commands 0% modulation, which means modulation valve 64 should be completely open.

Following initialization to predetermined commanded operating conditions, step 254 proceeds to step 256 which puts display 125 through a predetermined checking procedure which the operator observes to insure that all display elements are functional. Step 256 then proceeds to steps 258 and 260 which check the speed of engine 30 to insure that it will operate, when commanded, within allowable limits relative to each of its selectable operating speeds. Should engine 30 fail to respond correctly, step 260 branches to step 262 which stores a fault code appropriate for the detected malfunction, such as (1) RPM out of specification, and (2) check high speed circuit. Step 262 then proceeds to the unit shutdown steps 242 and 244.

When step 260 finds that engine 30 responds correctly to speed commands, step 264 determines if unit 20 has a modulation valve, and whether or not suction line modulation is required for the load to be carried in cargo space 90, such as by determining if the suction line modulation jumper 206 has been placed into position to connect line 204 to chassis ground. When step 264 finds that suction line modulation has been requested, steps 266 and 268 determine if modulation valve 64 will follow positioning commands. If modulation valve 64 is not functioning properly, as determined by steps 266 and 268, step 268 proceeds to step 270 which stores a fault code which indicates modulation should be checked, and program 230 proceeds to the unit shutdown steps 242 and 244.

When modulation valve 64 is found to be functioning properly, program 230 advances to steps 272 and 274, which check predetermined sensors. Step 264 also advances to the sensor checking steps 272 and 274 when step 264 finds that suction line modulation has not been selected. Steps 272 and 274 systematically check each sensor to determine if the output being provided is in a plausible range, with the sensors being checked including return air temperature sensor 100, discharge air temperature sensor 104, and ambient air temperature sensor 107. Should any sensor fail to pass the plausibility test, step 274 proceeds to step 276 which stores a fault code identifying the faulty sensor, and step 276 proceeds to the unit shutdown steps 242 and 244.

When the checked sensors are found to be functional, step 274 proceeds to steps 278 and 280 which determine if unit 20 has adequate cooling capacity. Steps 278 and 280 perform a dynamic checking procedure which selects a program value PV, to be hereinafter described, as a function of the temperatures of the ambient air 84 and return air 88, to insure that the procedure properly checks cooling capacity for the applicable operating conditions. If cooling capacity is found to be inadequate, step 280 proceeds to step 282 which stores a fault code indicating a cooling capacity fault, and step 282 proceeds to the unit shutdown steps 242 and 244.

Upon passing the cooling capacity check, step 280 proceeds to steps 284 and 286 which determine if unit 20 will operate in a heating mode when commanded. The heating mode is used to defrost evaporator 62, as well as to hold the set point temperature selected by set point selector 109. If unit 20 fails to respond by switching from the cooling mode to the heating mode, step 286 proceeds to step 288 which stores a fault code indicating a heating fault, and steps 242 and 244 shut unit 20 down.

When unit 20 responds properly to a heating mode command, steps 290 and 292 check a defrost damper function, to determine if voltage is applied to, and removed from, damper solenoid 184, upon command. Should a malfunction be found in the defrost damper function, step 292 proceeds to step 294, which stores an appropriate fault code, and unit 20 is shut down via steps 242 and 244.

If the defrost damper function is found to respond properly to commands, step 296 performs a universal fault checking function, to determine if any fault codes have been stored which were not serious enough to shut unit 20 down, but which should be called to the attention of the operator. If no fault codes are found, step 298 displays "PASS TRIP" on display 125, and program 230 exits at 246. If one or more fault codes are found in step 296, step 296 proceeds to step 300 which causes "CHECK TRIP" to be displayed on display 125. Step 300 then proceeds to program exit 246.

Figure 4:
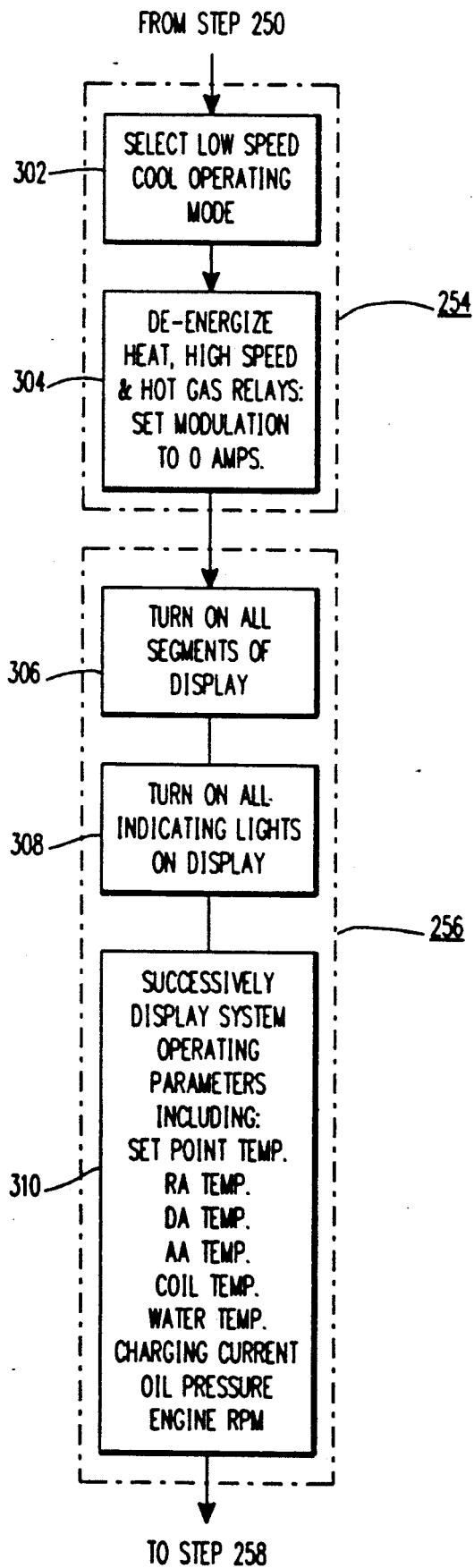
FIG. 4 is a flow diagram which sets forth detailed steps which may be used for a step of FIG. 3 related to checking of the display of the unit for proper operation.

FIG. 4 illustrates detailed steps which may be used to implement the initialization step 254 of FIG. 3, as well as step 256 which checks display 125. As hereinbefore stated, internal combustion engine 30 may have selectable operating speeds, such as 1400 RPM, called "low speed", and 2200 RPM, called "high speed". Engine 30 operates in low speed unless high speed relay 162 shown in FIG. 2B is energized, which closes normally open contacts 178 to energize high speed solenoid 120. High speed solenoid 120, when energized, moves the engine throttle to the selected high speed position. When high speed solenoid 120 is de-energized, the engine throttle is moved back to the selected low speed position. Thus, step 254 may comprise steps 302 and 304 which select a low speed cool (LSC) operating mode by de-energizing the heat relay 160, the high speed relay 162, and the hot gas relay 166, which cooperatively select the low speed cooling mode when all are de-energized. If the operator has not set the set point temperature selector 109 to the desired setting, this should also be done at this time. In addition, if a suction line modulation valve 64 is provided, it is set to 0% modulation by setting the valve current to 0 amperes. This initialization sets the stage for a first series of pre-trip checks.

Step 256, which checks display 125 for proper operation, comprises a series of steps 306, 308 and 310. Step 306 energizes all segments of any segmented type display, such as indicated generally at 127 in FIG. 2B, to notify the operator when any segment element is inoperative. An inoperative element of a display may indicate an incorrect fault code, for example, when certain numbers or letters are displayed. Step 308 then energizes all indicator lamps, shown generally at 129 in FIG. 2B, which notifies the operator when any should be replaced. Step 310 then steps through all of a predetermined plurality of system operating conditions, as well as operator selected operating parameters, with a few of the many possible important operating conditions being set forth in step 310, including starting the read-out by displaying the selected set point temperature, and the temperature of the return air 88, as sensed by the return air sensor 100. With a delay between each new display, such as a three second display, display 125 then successively displays the discharge air temperature, the ambient air temperature, the temperature of evaporator coil 62, and the water temperature, charging current, oil pressure, and operating speed, associated with engine 30 and alternator 138. As each value is displayed, an appropriate identifier is also simultaneously displayed to indicate what is being displayed, such as "DISA" for discharge air temperature, "AMB" for the ambient air temperature, and the like. The operator must observe display 125 and make appropriate notes while step 256 is being performed.

Figure 5:
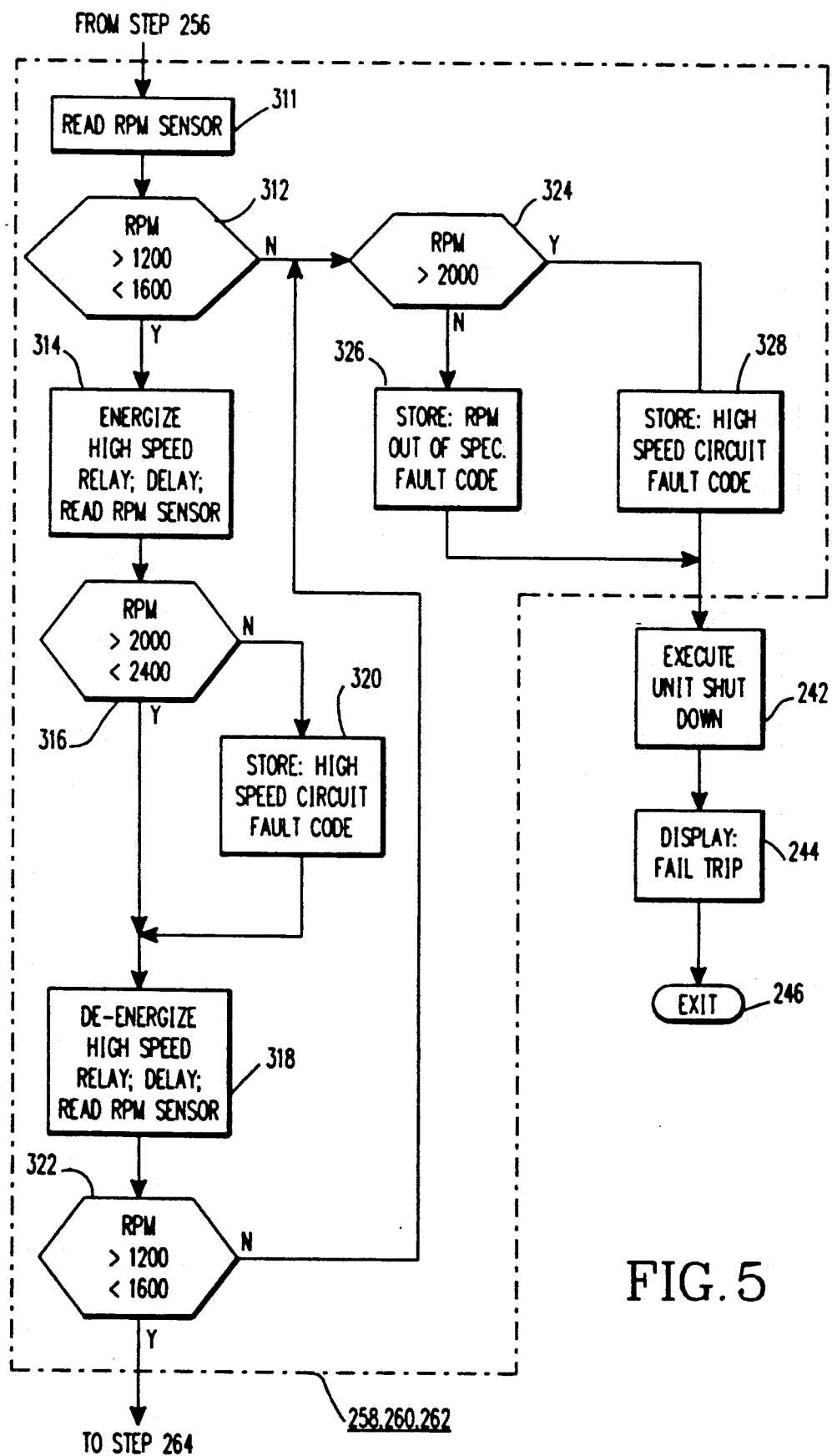
FIG. 5 is a flow diagram which sets forth detailed steps which may be used for a step of FIG. 3 related to the checking of a prime mover engine for proper operating speed.

FIG. 5 sets forth detailed steps used to implement steps 258, 260 and 262 of FIG. 3, which steps are related to the checking of engine 30 to determine if the engine responds properly to speed change commands, and if the engine operates within an allowable speed range associated with each commanded operating speed. Since the initialization step 254 selected low speed, which has a nominal value of 1400 RPM, step 322 reads the engine RPM provided by RPM sensor 118 and step 312 determines if engine 30 is operating within an allowable range relative to 1400 RPM. For example, step 312 may determine if the engine speed is greater than 1200 RPM and less than 1600 RPM, as indicated by engine RPM sensor 118 shown in FIG. 2B. When step 312 finds the engine speed in the allowable low speed range, it proceeds to step 314 which provides a signal via conductor 220 shown in FIG. 2B for energizing high speed relay 162. After a delay sufficient for engine 30 to stabilize at the commanded high speed value, step 314 reads the engine RPM and step 316 determines if engine 30 has responded to the high speed command, and is running within an allowable range relative to the nominal high speed value of 2200 RPM. For example, step 316 may determine if the engine speed is greater than 2000 RPM and less than 2400 RPM. If speed of engine 30 is in this allowable range, step 316 proceeds to step 318. If the speed of engine 30 is not in the allowable high speed range, step 316 proceeds to step 320 which stores a fault code in RAM 124 which indicates a fault condition resides in the high speed circuit. This indicates, for example, that the wiring associated with the high speed function may be incorrect, broken, or disconnected, that high speed relay 162 may not be picking in response to the command provided via conductor 220, that the high speed solenoid 120 may not be responding to the closing of contacts 178, that the linkage from high speed solenoid 120 to the engine throttle may be improperly adjusted, and the like. After storing the fault code, step 320 also proceeds to step 318.

Step 318 removes the energizing signal from high speed relay 162, and after a delay sufficient for engine 30 to return to low speed operation, step 318 reads the engine RPM and step 322 performs a low speed check similar to step 312. If engine 30 has returned correctly to low speed, the pre-trip program continues to step 264, notwithstanding that step 320 may have stored a fault code relative to high speed operation. As long as engine 30 will operate correctly at low speed, pre-trip is not aborted. Step 296 will detect a fault code stored by step 320, and step 300 will notify the operator to check the fault codes.

If either of steps 312 or 322 find that engine 30 will not operate within the allowable low speed range, they both proceed to step 324 which diagnoses the problem by determining if the engine speed exceeds a predetermined value, such as 2000 RPM. If the engine speed does not exceed 2000 RPM, the problem is most likely associated with the low speed circuits and step 326 stores a fault code which indicates that the engine RPM is outside specifications. If the engine speed exceeds 2000 RPM, engine 30 did not respond properly to the command to return to low speed, and step 328 stores a fault code which indicates a high speed fault. Steps 326 and 328 both proceed to the unit shut down steps 242 and 244.

Figure 6:
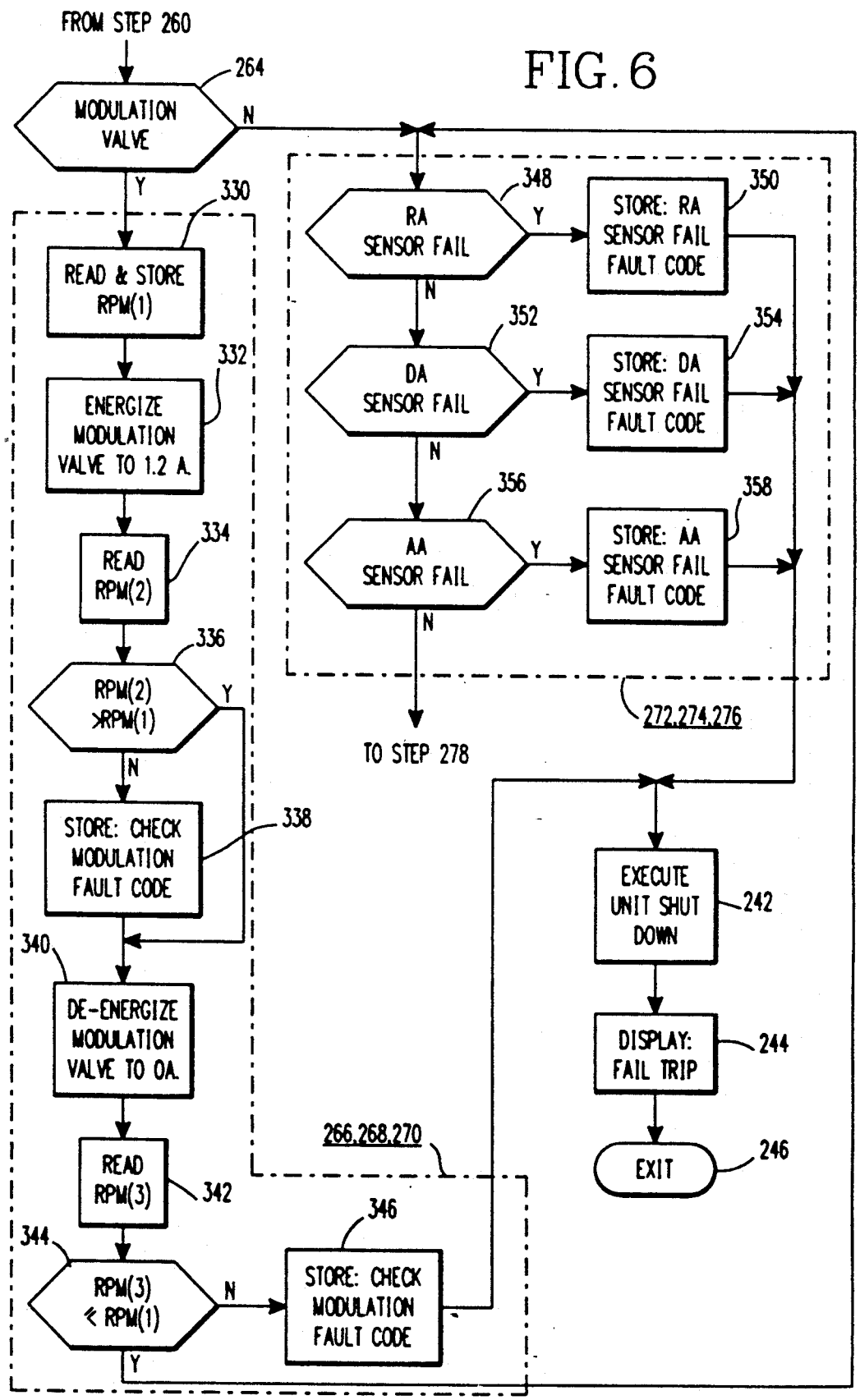
FIG. 6 is a flow diagram which sets forth detailed steps which may be used for steps of FIG. 3 related to the checking of a suction line modulation valve, and predetermined temperature sensors.

FIG. 6 sets forth detailed steps used to implement steps 266, 268 and 270 of FIG. 3, which steps are related to the checking of suction line modulation valve 64. FIG. 6 also sets forth detailed steps used to implement steps 272, 274, and 276 of FIG. 3, which steps are related to the checking of important sensors, such as the return air, discharge air, and ambient temperature sensors 100, 104 and 107, respectively. Turning first to the pre-trip checking procedure for modulation valve 64, it will be remembered that the initialization step 304 of FIG. 4 set the modulation to 0%, which fully opens valve 64. A fully open valve 64 provides the greatest load on engine 30.

When step 264 finds that suction line modulation will be required for the load being conditioned, or to be conditioned, step 330 reads and stores the RPM of engine 30, which will be referred to as RPM(1). Step 332 then initiates a predetermined closing of modulation valve, such as a closing which provides 100% modulation, via conductor 228 in FIG. 2B. A valve current of 1.2 amperes provides 100% modulation in a modulation valve known to us, with the specific current value required to provide maximum modulation depending upon the modulation valve utilized. A modulation of 100% presents the least load to engine 30, and if the modulation command was indeed initiated by a closing of valve 64, the speed of engine 30 will rise.

After a delay selected to allow modulation valve 64 to follow the closing command, step 334 reads the engine RPM, with this speed reading being referred to as RPM(2). Step 336 then determines if RPM(2) exceeds RPM(1). If the engine speed did not rise, modulation valve 64 was not closed as commanded, and step 338 stores a fault code which indicates suction line modulation should be checked. If RPM(2) exceeds RPM(1), then step 336 by-passes step 338 and proceeds to step 340. Step 338 also goes to step 340 after storing the appropriate fault code.

Step 340 then initiates a de-energization of modulation valve to 0 ampere, which should again provide maximum load on engine 30. After a delay selected to enable valve 64 to follow the opening command, step 342 reads the engine speed, which is referred to as RPM(3). Step 344 determines if RPM(3) is equal to, or less than, RPM(1), which would be the case if modulation valve 64 properly followed the command to return to 0% modulation. If modulation valve 64 did not fully re-open, unit 20 should be shut down, and step 344 proceeds to step 346, which stores a fault code to check modulation, and step 346 then proceeds to the unit shut down steps 242 and 244. If step 344 finds that the engine RPM(3) is equal to or less than RPM(1), then valve 64 is properly following commands, and step 344 proceeds to the sensor checking portion of program 230, which is where step 264 goes when modulation will not be used on the next trip of unit 20.

The hereinbefore mentioned application Ser. No. 07/728,463 sets forth a sensor checking program which sets appropriate sensor fail flags when a sensor is found to be faulty. Thus, steps 272, 274 and 276 may simply check the appropriate sensor fail flags to see if they are true. Application Ser. No. 07/728,463 is hereby incorporated into the present application by reference.

More specifically, step 348 checks the return air sensor fail flag to see if it is true or false, ie., a logic one or a logic zero. If the return air sensor fail flag is true it indicates that return air sensor 100 is faulty and step 350 stores a fault code in RAM 124 indicating that return air sensor 100 is faulty, and step 350 proceeds to the unit shut down steps 242 and 244. If the return air sensor fail flag is false, step 348 proceeds to step 352 which checks the discharge air sensor fail flag. If true, step 354 stores a fault code indicating that the discharge air sensor 104 is faulty, and unit 20 is shut down. When step 352 finds the discharge air sensor fail flag false, step 352 proceeds to step 356 which checks the ambient sensor fail flag. If true, step 358 stores a fault code which indicates the ambient air sensor 107 is faulty, and unit 20 is shut down via steps 242 and 244. When step 356 finds the ambient air sensor fail flag false, step 356 proceeds to step 278, which checks for adequate cooling capacity.

Figure 7:
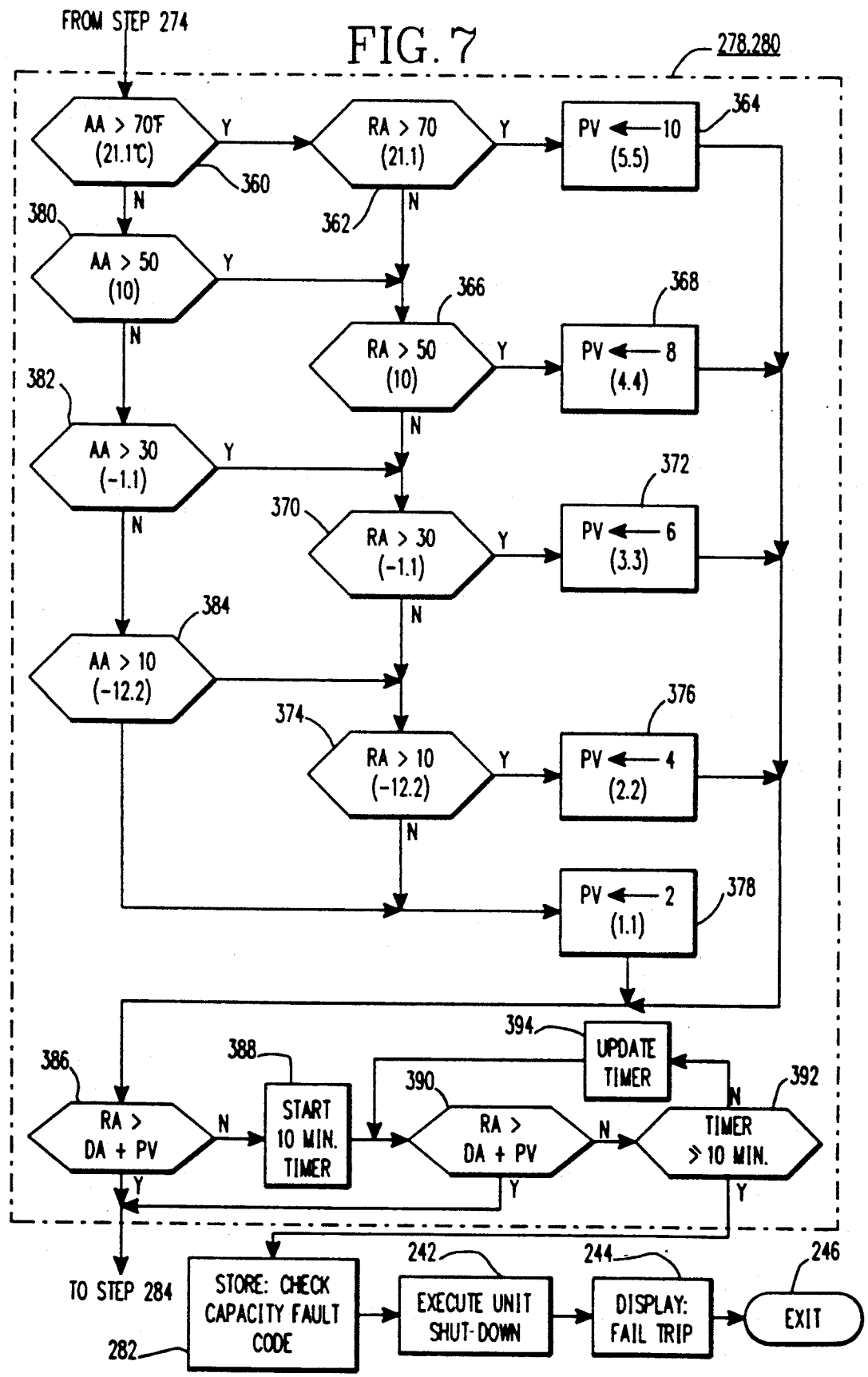
FIG. 7 is a flow diagram which sets forth detailed steps which may be used for steps of FIG. 3 related to insuring refrigeration capacity is adequate, with the method being a function of the temperatures of the ambient air, the air returning from a conditioned cargo space, and the discharge air.

FIG. 7 sets forth detailed steps used to implement steps 278 and 280 of FIG. 3, which steps are related to the checking of unit 20 for adequate cooling capacity. Steps 278 and 280, as implemented in FIG. 7, check cooling capacity as a dynamic function of the temperature values of the return air 88, the discharge air 92, and the ambient air 84. A program value PV is determined, the value of which is utilized in a comparison of the return air and discharge air temperatures. The temperature of the ambient air determines the maximum value of PV, and the temperature of the return air determines the actual value of PV, up to the maximum value set by the temperature of the ambient air.

More specifically, step 360 of FIG. 7 determines if the temperature AA of the ambient air 84 exceeds 70° F. (21.1° C.). If so, step 362 determines if the temperature RA of the return air exceeds 70° F. (21.1° C.). If so, step 362 proceeds to step 364 which sets program value PV equal to 10 (5.5), with 10 being used when the temperatures are measured in Fahrenheit, and 5.5 being used when the temperatures are measured in Celsius.

If the temperature RA of the return air does not exceed 70° F. (21.1° C.), then step 362 goes to step 366 which determines if the temperature RA of the return air exceeds 50° F. (10° C.). If so, step 366 proceeds to step 368 which sets PV equal to 8 (4.4). If step 366 finds that the temperature RA of the return air does not exceed 50° F. (10° C.), step 366 proceeds to step 370 which determines if the temperature RA of the return air exceeds 30° F. (−1.1° C.). If so, step 370 goes to step 372 which sets PV equal to 6 (3.3). If step 370 finds that the temperature RA of the return air does not exceed 30° F. (−1.1° C.), step 370 goes to step 374 which determines if the temperature RA of the return air exceeds 10° F. (−12.2° C.). If so, step 374 proceeds to step 376 which sets PV equal to 4 (2.2). If step 374 finds that the temperature RA of the return air does not exceed 10° F. (−12.2° C.), step 374 goes to step 378 which sets PV equal to 2 (1.1). Thus, an ambient temperature AA exceeding 70° F. (21.1° C.) sets the maximum value of PV to 10 (5.5), and the actual value of PV, which cannot exceed the maximum, is determined by the actual value of the return air temperature RA.

If step 360 finds that the ambient air temperature AA does not exceed 70° F. (21.1° C.), step 360 goes to step 380 which determines if the temperature AA of the ambient air 84 exceeds 50° F. (10° C.). If so, the maximum value for PV is 8 (4.4), with the actual value of PV being determined by the temperature RA of the return air 88 in steps 366, 370, and 374. Thus, if the temperature AA of the ambient air exceeds 70° F. (21.1° C.), a return air temperature of 75° F. (23.9° C.), for example, will set PV equal to 10 (5.5), while an ambient air temperature AA greater than 50° F. (10° C.) and less than 70° F. (21.1° C.) will result in a PV of 8 (4.4) for the same return air temperature of 75° F. (23.9° C.).

If step 380 finds the temperature AA of the ambient air 84 does not exceed 50° F. (10° C.), step 380 goes to step 382 which determines if the temperature AA of the ambient air 84 exceeds 30° F. (−1.1° C.). If so, the maximum determined by the temperature RA of the return air 88 in steps 370, and 374.

If step 382 finds the temperature AA of the ambient air 84 does not exceed 30° F. (−1.1° C.), step 382 goes to step 384 which determines if the temperature AA of the ambient air 84 exceeds 10° F. (−12.2° C). If so, the maximum value for PV is 4 (2.2), with the actual value of PV being determined by the temperature RA of the return air 88 in the "yes" and "no" branches of step 374.

If step 384 finds that the temperature AA of the ambient air 84 does not exceed 10° F. (−12.2° C.), then step 384 proceeds to step 378 which sets PV equal to 2 (1.1).

Steps 364, 368, 372, 376 and 378, after setting the program value PV, all proceed to step 386 which checks for adequate cooling capacity under the currently existing conditions of ambient air temperature and return air temperature by determining if the return air temperature RA exceeds the sum of the temperature DA of the discharge air plus the stored program value PV. If RA exceeds DA +PV, then unit 20 has adequate cooling capacity, and the program proceeds to step 284.

If RA does not exceed DA +PV, a predetermined period of time is provided for allowing the cooling capacity to increase, such as 10 minutes. Thus, step 386 proceeds to step 388 which starts a 10 minute timer, which may be maintained in RAM 124, and step 390 then makes the same comparison as step 386, checking to determine if RA exceeds DA +PV. If step 390 finds a "no" answer to this comparison, step 390 goes to step 392 which determines if the 10 minute time period has elapsed. If not, step 392 goes to step 394 which updates the 10 minute timer, and step 394 returns to step 390. This program loop continues until step 390 finds that RA exceeds DA +PV, or the 10 minute time period has elapsed. If the loop is broken by step 390, the cooling capacity of unit 20 is adequate, and step 390 goes to step 284. If the loop is broken by step 392, the cooling capacity of unit 20 is not adequate, and step 392 goes to the hereinbefore described step 282 which stores an appropriate fault code, and to steps 242 and 244 which shut unit 20 down.

Figure 8:
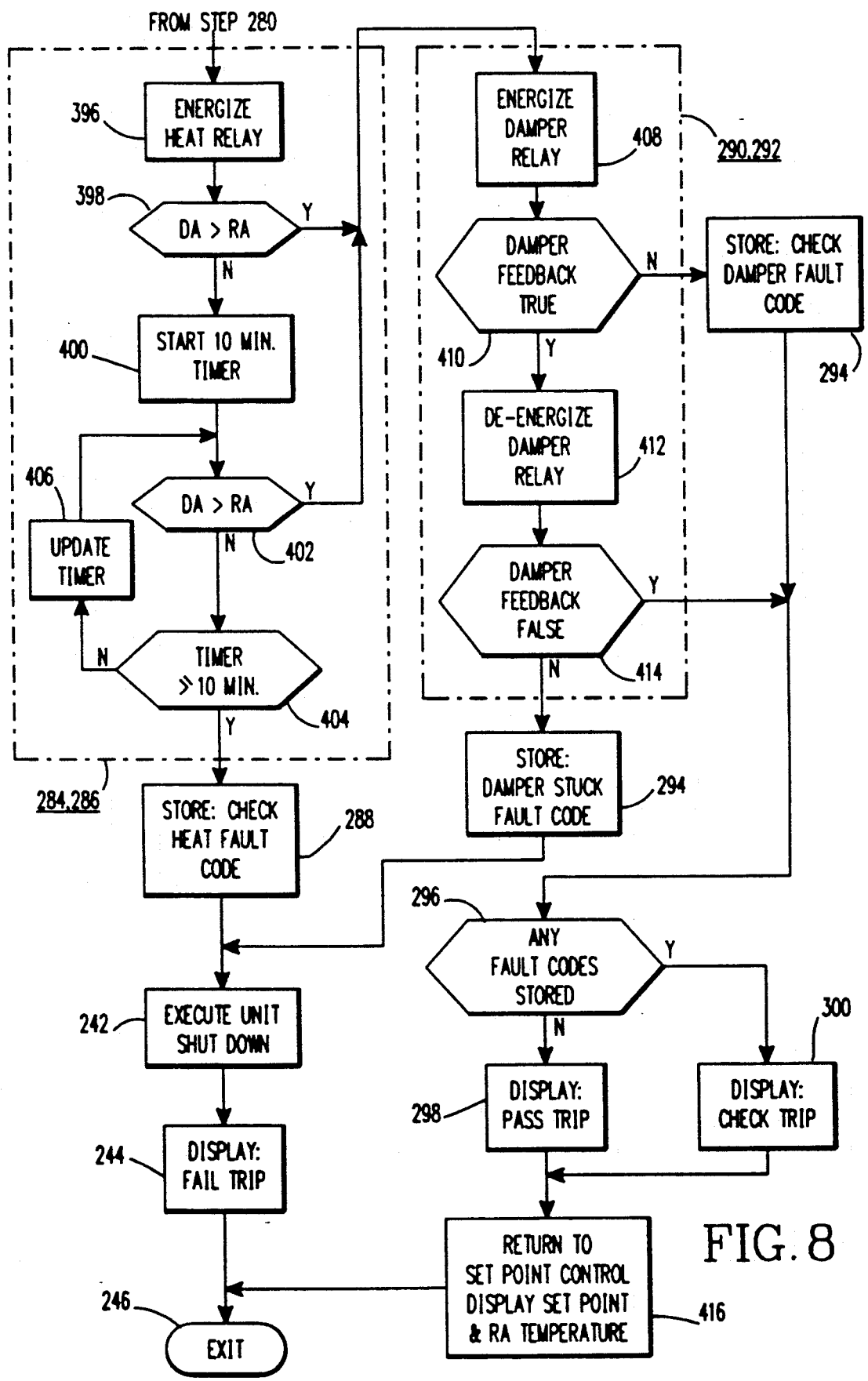
FIG. 8 is a flow diagram which sets forth detailed steps which may be used for steps of FIG. 3 related to the checking of a heat mode, and the operation of a defrost damper.

FIG. 8 sets forth detailed steps used to implement steps 284 and 286 of FIG. 3, which steps are related to determining if unit 20 will respond to a heating mode command, and FIG. 8 also sets forth detailed steps used to implement steps 290 and 292 which are related to the checking for proper operation of the defrost damper 93.

More specifically, step 396 initiates the energizing of heat relay 160 via conductor 224, and after a short delay selected to enable unit 20 to switch from the cooling to the heating mode, step 398 determines if the temperature DA of the discharge air 92 exceeds the temperature RA of the return air 88. If so, unit 20 responded properly to the heating command, and step 398 proceeds to step 290. If DA does not exceed RA, more time is provided, such as 10 minutes, with step 398 proceeding to step 400 which starts a 10 minute timer in RAM 124. Step 400 proceeds to step 402, which is similar to step 398, determining if DA exceeds RA. If not, step 402 goes to step 404 which determines if the 10 minute time period has elapsed. If not, step 404 proceeds to step 406 which updates the 10 minute timer, and step 406 returns to step 402. This loop continues until either step 402 finds unit 20 has responded to the heating mode command, or step 404 finds the 10 minute time period has elapsed. If step 404 breaks the program loop, step 404 proceeds to the hereinbefore described step 288 which stores an appropriate fault code, and to steps 242 and 244 which shut unit 20 down. If step 402 breaks the loop, unit 20 is in a heating mode, and step 402 continues the pre-trip procedure by proceeding to the damper check of steps 290 and 292.

The checking of defrost damper operation starts with step 408 which provides a command to energize damper relay 164 via conductor 218. Step 408 proceeds to step 410 which determines if damper feedback provided by conductor 211 is true, ie., has voltage been applied to line 211 and thus to damper solenoid 184? If the damper feedback is true damper 93 should be closed, as commanded, and step 410 proceeds to step 412, which issues a command to de-energize damper relay 164. Step 414 then determines if the damper feedback is false, ie., is conductor 211 deenergized? If conductor 211 is still energized, step 414 proceeds to the hereinbefore described step 294 which stores a fault code indicating damper 93 is closed, and unit 20 is shut down via the shut down steps 242 and 244.

If step 410 finds that damper solenoid has not been energized as commanded, step 410 proceeds to the hereinbefore described step 294 which stores a fault code indicating the damper circuits should be checked. Step 294 proceeds to the hereinbefore described step 296, as does the "yes" branch of step 414 when voltage was found to have been properly removed from damper solenoid 184 in response to the de-energize command of step 412. Step 296 checks for any stored fault codes, with step 296 selecting either "PASS TRIP" or "CHECK TRIP" for display 125. Steps 298 and 300 both proceed to a step 416 before exiting program 230 at 246, with step 416 returning the operation of unit 20 to set point control. Step 416 also displays the selected set point and return air temperature, which are continuously displayed until the operator requests other operating conditions to be displayed.

We claim:

1. A method of automatically checking predetermined functions and operating performance of a transport refrigeration unit having electrical control, electrically controlled components, a refrigeration circuit which includes a refrigerant compressor, and a prime mover for the refrigerant compressor which includes an internal combustion engine, with the transport refrigeration system conditioning air returning from a cargo space via commanded heating and cooling modes, as required to hold a predetermined set point temperature, and discharging the conditioned air back into the cargo space, and including temperature sensors for providing the temperatures of the return air, discharge air and ambient air, comprising the steps of:

measuring the current draw of predetermined electrical components with the prime mover stationary, comparing the measured current draw of each electrical component with an allowable range for the component, starting the internal combustion engine at a predetermined rated speed when the comparison step finds that the current draw for each component checked is in the associated allowable range, determining the actual speed of the internal combustion engine, comparing the actual speed of the internal combustion engine with an allowable range for the predetermined rated speed, commanding the transport refrigeration system to operate in a cooling mode, checking for adequate cooling capacity of the transport refrigeration unit as a dynamic function of the temperature values of the return air, discharge air, and ambient air, commanding the transport refrigeration system to operate in a heating mode, determining if the transport refrigeration system is operating in the commanded heating mode by comparing the temperatures of the return air and discharge air, and preparing an indication of a fault condition descriptive of any detected malfunction and marginal operating performance.

2. The method of claim 1 wherein the transport refrigeration unit includes a display which includes display segments and indicator lamps, and including the steps of:

displaying all display segments, and lighting all indicator lamps.

3. The method of claim 1 wherein the internal combustion engine is operable at a selected one of predetermined low and high speeds, with the step of starting the internal combustion engine starting the engine at low speed, and including the steps of:

shutting the transport refrigeration unit down in the event the actual speed of the internal combustion engine is not in the predetermined allowable range, switching the internal combustion engine to high speed when low speed is found to be in the allowable range, determining the actual speed of the internal combustion engine, comparing the actual speed with an allowable range associated with the predetermined high speed, storing an indication of a fault when the speed of the internal combustion engine is not in the allowable range for the predetermined high speed, switching the internal combustion engine to low speed, determining the actual speed of the internal combustion engine, the actual speed with the allowable range for the predetermined low speed, and shutting the transport refrigeration unit down when the comparison step finds the actual speed is not within the allowable range for the predetermined low speed.

4. The method of claim 1 wherein the transport refrigeration unit includes a suction line modulation valve, and including the steps of:

operating the transport refrigeration unit in a cooling mode with the modulation valve open, storing the speed of the internal combustion engine, closing the modulation valve to a predetermined setting, determining the speed of the internal combustion engine after the step of closing the modulation valve, comparing the determined speed with the stored speed of the internal combustion engine, and storing an indication of a fault in the event the comparison step does not find that the determined speed exceeds the stored speed.

5. The method of claim 4 including the steps of:

opening the modulation valve, determining the speed of the internal combustion engine, comparing the determined speed of the internal combustion engine with the stored speed, and shutting the transport refrigeration unit down in the event that the speed of the internal combustion engine exceeds the stored speed.

6. The method of claim 1 including the steps of:

checking the return air, discharge air and ambient air sensors to determine if their readings are in a plausible range, and shutting the transport refrigeration unit down if any sensor is not in the associated plausible range.

7. The method of claim 1 wherein the step of checking for adequate cooling capacity includes the steps of:

determining if the temperature of the return air exceeds the temperature of the discharge air plus a program value selected to indicate adequate cooling capacity, providing the predetermined program value as a function of the temperatures of the ambient air and return air, and shutting the transport refrigeration unit down when the determining step finds that the temperature of the return air does not exceed the temperature of the discharge air plus the program value provided by the providing step.

8. The method of claim 7 wherein the providing step includes the steps of:

using the temperature of the ambient air to determine the maximum value of the program value, and using the temperature of the return air to select the actual program value, which does not exceed said maximum value.

9. The method of claim 1 including the step of shutting the transport refrigeration unit down in the event the step of determining if the transport refrigeration system is operating in the commanded heating mode when the comparison of the return air and discharge air temperatures finds that discharge air temperature does not exceed the return air temperature.

10. The method of claim 1 wherein the transport refrigeration system includes a defrost damper relay which, when energized, initiates the closing of a damper which prevents air from being discharged into the cargo space, and including the steps of:

energizing the damper relay, providing a feedback signal which indicates the position of the damper, checking the feedback signal, storing an appropriate fault code when the feed back signal indicates the damper did not close, de-energizing the damper relay, checking the feedback signal, and shutting the transport refrigeration system down when the feedback signal indicates the damper is not open.

11. A method of automatically checking predetermined functions and operating performance of a transport refrigeration unit operable in a cooling mode, and including electrical control, electrically controlled components, including a modulation valve, a refrigeration circuit which includes the modulation valve in a suction line thereof, a refrigerant compressor connected to the refrigerant circuit, and a prime mover for the refrigerant compressor which includes an internal combustion engine, comprising the steps of:

running the internal combustion engine, operating the transport refrigeration unit in the cooling mode with the modulation valve open, storing the speed of the internal combustion engine, closing the modulation valve to a predetermined setting, determining the speed of the internal combustion engine after the closing step, comparing the determined speed with the stored speed of the internal combustion engine, and storing an indication of a fault in the event the comparison step does not find that the determined speed exceeds the stored speed.

12. The method of claim 11 including the steps of:

opening the modulation valve, determining the speed of the internal combustion engine, comparing the determined speed of the internal combustion engine with the stored speed, and shutting the transport refrigeration unit down in the event that the speed of the internal combustion engine exceeds the stored speed.

13. The method of claim 12 wherein the step of closing the modulation valve to a predetermined setting operates the transport refrigeration unit in 100% modulation.

* * * * *